(12) United States Patent
Li et al.

(10) Patent No.: US 11,718,959 B2
(45) Date of Patent: Aug. 8, 2023

(54) WORKPIECE OF YANKEE CYLINDER SECTION AND PROCESS FOR MANUFACTURING A YANKEE CYLINDER

(71) Applicant: ANDRITZ CHINA LTD, Guangdong (CN)

(72) Inventors: Weijun Li, Guangdong (CN); Rongjun Qin, Guangdong (CN); Florian Steinwender, Guangdong (CN)

(73) Assignee: ANDRITZ CHINA LTD, Guangdong (CN)

( * ) Notice: Subject to any disclaimer, the term of this patent is extended or adjusted under 35 U.S.C. 154(b) by 0 days.

(21) Appl. No.: 17/787,173

(22) PCT Filed: Nov. 5, 2020

(86) PCT No.: PCT/CN2020/126621
§ 371 (c)(1),
(2) Date: Jun. 17, 2022

(87) PCT Pub. No.: WO2021/120912
PCT Pub. Date: Jun. 24, 2021

(65) Prior Publication Data
US 2023/0119888 A1    Apr. 20, 2023

(30) Foreign Application Priority Data

Dec. 18, 2019    (CN) .......................... 201911307258.5

(51) Int. Cl.
*D21F 5/02* (2006.01)
*B23K 26/24* (2014.01)

(52) U.S. Cl.
CPC .............. *D21F 5/021* (2013.01); *B23K 26/24* (2013.01)

(58) Field of Classification Search
CPC .......... D06F 5/021; B23K 26/24; D21F 5/021
(Continued)

(56) References Cited

U.S. PATENT DOCUMENTS 3,052,039 A    11/1957 Russell
3,217,795 A    11/1965 Cirrito
(Continued)

FOREIGN PATENT DOCUMENTS

CN    101641475 A    2/2010
CN    203977226 U    12/2014
(Continued)

OTHER PUBLICATIONS

Patent Cooperation Treaty, International Preliminary Report on Patentability, Application No. PCT/CN2020/126621, dated Jun. 30, 2022, in 13 pages.
(Continued)

*Primary Examiner* — Stephen M Gravini
(74) *Attorney, Agent, or Firm* — Procopio, Cory, Hargreaves & Savitch LLP

(57) ABSTRACT

The present invention relates to a process for manufacturing a Yankee cylinder. The process comprises welding the first reinforcement flanges of two workpieces of Yankee cylinder section from inside of the cylinder case, preheating and welding the two workpieces of Yankee cylinder section from outside of the cylinder case, and then removing the first, second reinforcement flanges, radial inner end area of the weld and their surrounding material in the workpieces of the Yankee cylinder section, so that the joint of the two workpieces of Yankee cylinder section is machined to meet the final dimension requirements for the Yankee cylinder inner grooves. The present invention is also related to a workpiece of Yankee cylinder section used in the said process.

7 Claims, 2 Drawing Sheets

(58) Field of Classification Search
USPC .......................................... 34/108, 110–124
See application file for complete search history.

(56) References Cited

U.S. PATENT DOCUMENTS

| | | | | |
|---|---|---|---|---|
| 3,241,251 | A * | 3/1966 | Justus | F26B 13/183 |
| | | | | 34/124 |
| 3,802,093 | A * | 4/1974 | Ebeling | F26B 13/183 |
| | | | | 34/124 |
| 4,184,268 | A * | 1/1980 | Christin | D21F 5/10 |
| | | | | 34/124 |
| 4,320,582 | A | 3/1982 | Klippstein et al. | |
| 6,018,870 | A | 2/2000 | Marschke et al. | |
| 6,219,934 | B1 | 4/2001 | Moskowitz | |
| 7,614,161 | B2 * | 11/2009 | Haurie | F26B 13/183 |
| | | | | 165/83 |
| 8,127,462 | B2 * | 3/2012 | Haurie | F26B 13/183 |
| | | | | 219/471 |
| 8,826,560 | B2 * | 9/2014 | Beach | F28F 5/02 |
| | | | | 277/306 |
| 9,885,152 | B2 * | 2/2018 | Schmid | D21F 5/021 |
| 2022/0349124 | A1 * | 11/2022 | Gscheider | D21D 5/026 |
| 2023/0060403 | A1 * | 3/2023 | Gscheider | D21D 5/04 |
| 2023/0060771 | A1 * | 3/2023 | Gscheider | D21D 5/026 |

FOREIGN PATENT DOCUMENTS

| | | |
|---|---|---|
| CN | 105195913 A | 12/2015 |
| CN | 107338669 A | 11/2017 |
| CN | 208019658 U | 10/2018 |
| CN | 110055802 A | 7/2019 |
| CN | 209873446 U | 12/2019 |
| CN | 111001960 A | 4/2020 |
| DE | 1939584 U | 5/1966 |
| DE | 202007004709 U1 | 6/2007 |
| EP | 1279764 A2 | 1/2003 |
| EP | 1550768 A2 | 7/2005 |
| EP | 1703186 A1 | 9/2006 |
| EP | 2503055 A1 | 9/2012 |
| EP | 2689065 A1 | 1/2014 |
| EP | 2689066 A1 | 1/2017 |
| EP | 3314055 B1 | 4/2019 |
| EP | 3556936 A1 | 10/2019 |
| FR | 1318133 A | 2/1963 |
| WO | 2008015005 A2 | 2/2008 |
| WO | WO 2013/044676 * | 4/2013 |

OTHER PUBLICATIONS

Canadian Intellectual Property Office, Office Action, Application No. 3,162,081, dated Sep. 29, 2022, in 6 pages.

Patent Cooperation Treaty, International Search Report, Application No. PCT/CN2020/126621, dated Jan. 12, 2021, in 8 pages.

China National Intellectual Property Administration, The First Office Action, Application No. 201911307258.5, dated Mar. 2, 2021, in 9 pages.

* cited by examiner

WORKPIECE OF YANKEE CYLINDER SECTION AND PROCESS FOR MANUFACTURING A YANKEE CYLINDER

This application is US National Stage of International Patent Application PCT/CN2020/126621, filed Nov. 5, 2020, which claims benefit of priority from Chinese Patent Application CN201911307258.5, filed Dec. 18, 2019, the contents of both of which are incorporated herein by reference.

TECHNICAL FIELD

The invention is related to a process for manufacturing a Yankee cylinder. The invention is also related to a workpiece of Yankee cylinder section.

BACKGROUND

So-called Yankee cylinders are commonly used in the drying process for the production of paper webs or tissue.

Yankee cylinders usually have a very large diameter. They are heated from the inside using steam and are difficult to manufacture because of the stringent demands to be met relating to the inner pressures the cylinder must withstand, the cylinder's leak-tightness, and its large diameter.

Standard Yankee cylinders may have the following dimensions:
Cylinder diameter: 2000 mm to 6500 mm
Diameter of hollow shaft: 1000 mm to 2500 mm
Cylinder length: 3000 mm to 8500 mm
Cylinder mass: 35 t to 140 t The vast majority of these cylinders are made of cast iron, however Yankee cylinders made of steel are also known from U.S. Pat. No. 4,196,689 and from WO 2008/105005 A1.

Normally, a Yankee cylinder consists of a cylindrical shell surface, which is closed at the ends with end covers. The two covers can either be bolted or welded to the cylinder shell.

A Yankee cylinder rotates via journals and has a hollow shaft or axle inside through which the steam for heating the cylinder is introduced and exhaust steam and condensate can be removed.

The cylinder shell often has a large number of inner grooves on its inner surface, which improve heat transition from the heated inside of the cylinder to the cylinder surface, without substantially diminishing the component strength of the shell.

Conventionally, a Yankee cylinder shell is manufactured by welding a plurality of Yankee cylinder sections. As shown in FIG. 3, it is necessary to weld both outside and inside the cylinder by means of initially performing TIG on the inner side of the cylinder at the joints of the cylinder sections, and then machining the weld gap to remove the protruded material, in order to form a Yankee cylinder inner groove of prescribed dimensions, and then performing GSMA for the outside of the cylinder, and finally, properly machining the outer surface of the cylinder, so as to obtain the final Yankee cylinder.

In this application, machining refers steps of turning, milling and grinding, etc.

This procedure is time and cost intense and has a high risk for gaining weld imperfections. Besides, the weld operator has to work under hard conditions of hot, confined spaces.

SUMMARY

Thus, it is the technical problem to be solved of this invention to provide a process for manufacturing a Yankee cylinder and a workpiece of Yankee cylinder section used in said process that can overcome the above mentioned drawbacks.

To solve the above mentioned technical problem, according to one aspect of the invention, a workpiece of Yankee cylinder section is provided. said workpiece of Yankee cylinder section of Yankee cylinder has the followings on its end faces: welding bevel, which is adapted to be welded from the outside of the workpiece of Yankee cylinder section; a first reinforcement flange, which protrudes outwards along the axial direction of the workpiece of Yankee cylinder section, and is provided on the end face of the workpiece of Yankee cylinder section close to the inner circumferential wall of the workpiece of Yankee cylinder section; a second reinforcement flange, which protrudes outwards along the axial direction of the workpiece of Yankee cylinder section, and is provided on the end face of the workpiece of Yankee cylinder section close to the radially inner end of welding bevel; a second reinforcement flange receiving part, which is adjacent to the second reinforcement flange in the radial direction of the workpiece of Yankee cylinder section; wherein the second reinforcement flange is adapted to rest on the second reinforcement flange receiving part of another workpiece of Yankee cylinder to be welded, and the second reinforcement flange receiving part is adapted to receive the second reinforcement flange of said workpiece of Yankee cylinder to be welded, wherein the second reinforcement flange of the workpiece of Yankee cylinder rests on the second reinforcement flange of the workpiece of Yankee cylinder to be welded on their corresponding circumferential sides.

Preferably, the welding bevel is adapted to narrow gap welding. With narrow gap welding, for example, Narrow Gap Tungsten Inert Gas Welding (NG-TIG), the welding volume is reduced, and thus the occurrence of welding imperfection is reduced. Narrow Gap welding is based on the conventional arc welding technology, employing I- or U-form welding bevels of small size. Comparing with the conventional welding, the advantages of narrow gap welding are the reduction of consumption of welding materials and electricity, the smaller residual stress and deformation of the welding joint, and the better kinetic features of the joint. Narrow gap welding is a well-developed method for welding around circumference. It applies minimized heat onto the materials, and thus minimizes the heat deformation.

According to a preferable embodiment of he workpiece of Yankee cylinder section, the first reinforcement flange of the workpiece of the Yankee cylinder section is configured to join with the first reinforcement flange of said workpiece of Yankee cylinder section to be weld, so that they can be welded from the inner side of the workpiece of Yankee cylinder section. Thus, the welding in the Yankee cylinder section only needs to be perform in the limited area between the first reinforcement flanges of the two workpieces of the Yankee cylinder section.

According to a preferable embodiment of the workpiece of Yankee cylinder section, there are prefabricated grooves on the inner wall of the workpiece of Yankee cylinder section, said prefabricated grooves can be machined to the final dimensions of the inner grooves of the Yankee cylinder.

According to another aspect of the invention, a process for manufacturing a Yankee cylinder is provided. The process comprises the following steps:
(a) providing workpieces of Yankee cylinder section as above defined;
(b) joining two workpieces of Yankee cylinder section to be welded together to form a Yankee cylinder case in such a way that the second reinforcement flange of a workpiece of Yankee cylinder section rests on the second reinforcement flange receiving part of the other workpiece of Yankee cylinder section (c) welding the first reinforcement flanges of the two workpieces of Yankee cylinder section from the inner side of the Yankee cylinder case;

(d) preheating the welding bevels of the two workpieces of Yankee cylinder section and welding said welding bevels from the outside of the Yankee cylinder case to form a weld;

(e) removing the first reinforcement flange, the second reinforcement flange, the radial inner end area of the weld formed by the welding bevels and their surrounding material by machining, so that the joint of the two workpieces of Yankee cylinder section is machined to meet the final dimension requirements for the inner groove of the Yankee cylinder;

(f) removing the residual material on the outer surface of the Yankee cylinder case and the weld by machining to meet the final dimension requirements for the outer diameter of the Yankee cylinder.

According to a preferable embodiment of the process for manufacturing a Yankee cylinder, said process comprises the following step after step (d):

(g) Machining the prefabricated grooves of the workpiece of Yankee cylinder section to meet the final dimension requirements for the inner grooves of the Yankee cylinder.

In another word, it is one option to first machining the prefabricated grooves of the workpiece of Yankee cylinder section to the inner grooves of the Yankee cylinder and then machining the joint of the two workpieces of Yankee cylinder section to the inner grooves of the Yankee cylinder; it is also an option to first machining the joint of the two workpieces of Yankee cylinder section to the inner grooves of the Yankee cylinder and then machining the prefabricated grooves of the workpiece of Yankee cylinder section to the inner grooves of the Yankee cylinder.

Comparing with the conventional art, the process for manufacturing Yankee cylinder according to the invention may reduce the manufacturing time by 250 hours, because on the inner side of the cylinder no TIG by the operator in the cylinder is required, but only simple welding of the first reinforcement flanges of the neighboring workpieces of Yankee cylinder section is performed.

Preferably, in step (d), the welding bevels are welded by narrow gap welding. Thus, the consumption of welding materials and electricity is substantially reduced, the residual stress and deformation of the joint is reduced, and the kinetic features of the joint are improved.

As in step (e), critical welding root area is removed by final machining, the quality of the Yankee cylinder case is ensured.

As it is only the first reinforcement flanges of the two workpieces of Yankee cylinder section that are welded from inside, and final welding of the two cylinder sections is no longer performed inside the cylinder, and the welded parts, namely the first reinforcement flanges, and their joint will be removed in later process by machining, the process for manufacturing Yankee cylinder of the invention permits operators not to weld inside the hot, confined spaces, which significantly reduces the health and safe risk of the operator.

BRIEF DESCRIPTION OF THE DRAWINGS

The process for manufacturing a Yankee cylinder and the workpiece of Yankee cylinder section of the invention are described in details with the drawings.

In the drawings, identical or similar technical features have identical reference numbers.

DETAILED DESCRIPTION

Figure 1:
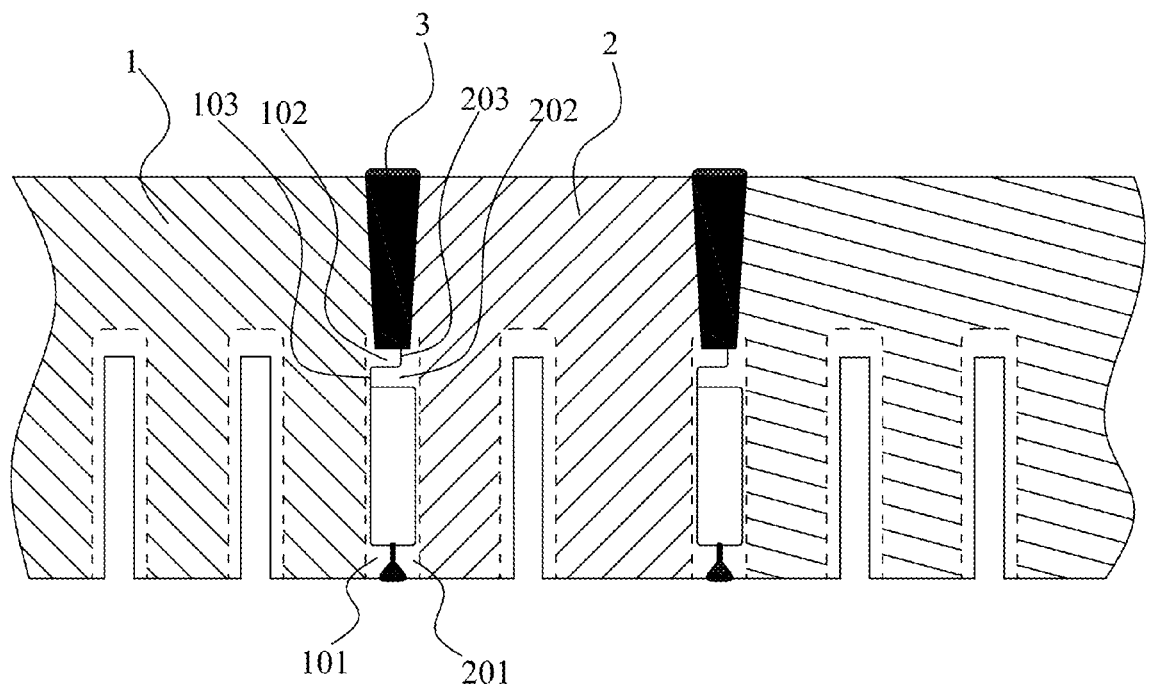
FIG. 1 shows the workpiece of Yankee cylinder section in partial cross section in axial direction, in which three workpieces of Yankee cylinder section are shown welded together.

FIG. 1 shows the workpieces of Yankee cylinder section in partial cross section in axial direction, in which three workpieces of Yankee cylinder section are shown welded together.

To manufacture the Yankee cylinder case, first join the workpieces of the Yankee cylinder sections 1, 2.

The first reinforcement flange 101 of the workpiece of the Yankee cylinder section 1 on the left and the first reinforcement flange 201 of the workpiece of the Yankee cylinder section 2 in the middle joins to a proper extent for welding together.

In the radial direction of the workpiece of Yankee cylinder section 1,2, the second reinforcement flange 102 and the second reinforcement flange receiving part 103 of the workpiece of the Yankee cylinder section 1 on the left are adjacent to each other; , the second reinforcement flange 202 and the second reinforcement flange receiving part 203 of the workpiece of the Yankee cylinder section 2 in the middle are adjacent to each other.

As seen from the drawings, the second reinforcement flange 102 of the workpiece of the Yankee cylinder section 1 is provided on the radial outer side of the second reinforcement flange receiving part 103. The second reinforcement flange 202 of the workpiece of the Yankee cylinder section 2 is provided on the radial inner side of the second reinforcement flange receiving part 203.

The second reinforcement flange 102 of the workpiece of the Yankee cylinder section 1 on the left and the second reinforcement flange 202 of the workpiece of the Yankee cylinder section 2 in the middle rest on each other on their corresponding circumferential sides. The second reinforcement flange 102 of the workpiece of Yankee cylinder section on the left rests with a end face protrudes outwards along the axial direction of the workpiece of Yankee cylinder section 1,2 on the second reinforcement flange receiving part 203 of the workpiece of Yankee cylinder section in the middle. The second reinforcement flange 202 of the workpiece of Yankee cylinder section in the middle rests with a end face protruding outwards along the axial direction of the workpiece of Yankee cylinder section on the second reinforcement flange receiving part 103 of the workpiece of Yankee cylinder section 1 on the left. Their shapes and dimensions are designed within the range of the shape and dimension of the final Yankee cylinder inner grooves, so that Yankee cylinder inner grooves of required shape and dimension can be obtained in a later step by machining.

Now, the first reinforcement flange 101 of the workpiece of the Yankee cylinder section 1 on the left and the first reinforcement flange 201 of the workpiece of the Yankee cylinder section 2 in the middle that already joined together are welded.

Then, the welding bevels of the workpiece of the Yankee cylinder section 1 on the left and the workpiece of the Yankee cylinder section 2 in the middle are preheated and welded from the outside of the cylinder case with each other to form a weld 3, especially by means of narrow gap welding, for example, Narrow Gap Tungsten Inert Gas Welding.

Using the workpieces of the Yankee cylinder section 1, 2 on the left and in the middle of the drawings, there are welding bevels with inclination and shape that are suitable to narrow gap welding on the faces to be joined. The shape of the welding bevels is a U-shape, but I-shape or other shape that suitable for narrow gap welding is also considerable in practice.

Figure 2:
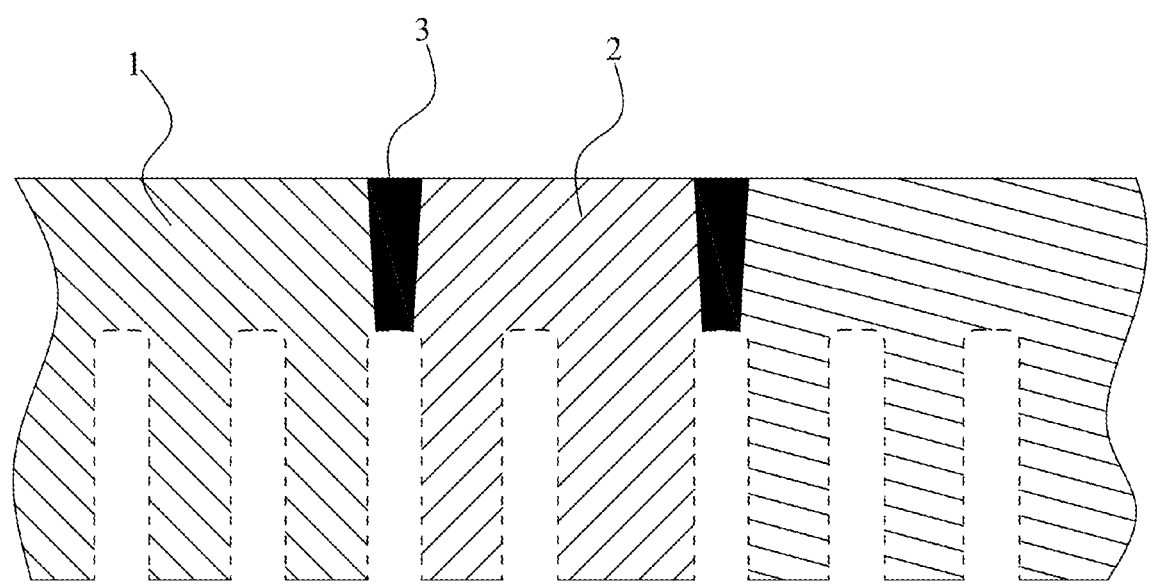
FIG. 2 shows the workpiece of Yankee cylinder section in partial cross section in axial direction, in which Yankee cylinder case after welding and machining is shown.
Figure 3:
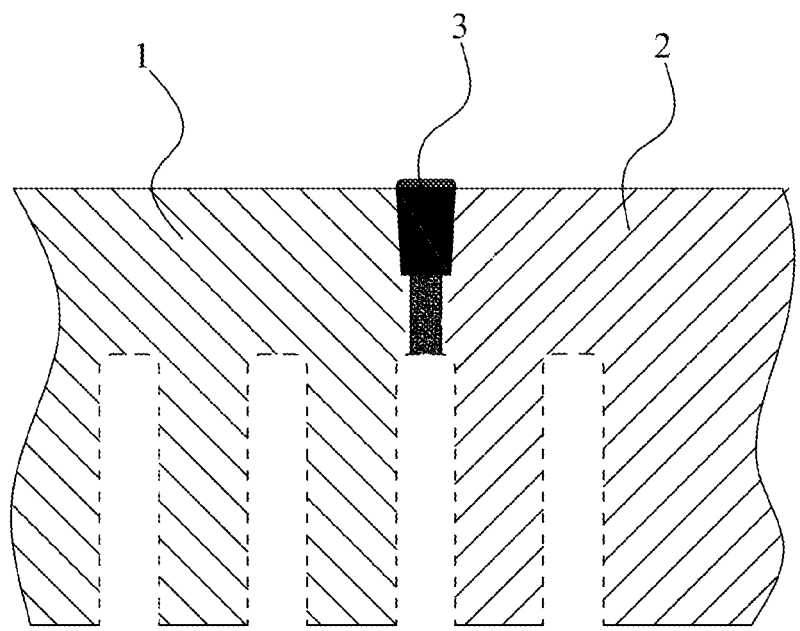
FIG. 3 shows Yankee cylinder sections that welded together in partial cross section in axial direction.

After completing welding, the first reinforcement flange, the second reinforcement flange, the radial inner end area of the weld formed by the welding bevels and their surrounding material are removed by machining, so that the joint of the two workpieces of Yankee cylinder section is machined to form an inner groove of the Yankee cylinder. Meanwhile, the residual material on the outer surface of the Yankee cylinder case and the weld are removed by machining to meet the final dimension requirements for the outer diameter of the Yankee cylinder. FIG. 2 shows the Yankee cylinder case after said welding and machining.

In the above mentioned process, the workpiece of the Yankee cylinder section 1, 2 may already have finished Yankee cylinder inner grooves, may only have prefabricated grooves, which, in order to meet the final dimension requirements for the Yankee cylinder inner grooves, still undergoes machining after completing the above mentioned steps.

The above discloses the preferable embodiments of this invention, while the spirit and scope of this invention are not limited within the specific contents disclosed here. Those skilled in the art can make more embodiments and applications according to teaching of this invention, and these embodiments and applications will be within the spirit and scope of this invention. Therefore, it will be understood that the specific embodiments do not define the spirit and scope of this invention, which is defined by the claims.

What is claimed is that:

1. A workpiece of Yankee cylinder section (1, 2), characterized in that, said workpiece of Yankee cylinder section comprises on an end face of the workpiece:
    a welding bevel adapted to be welded from an outside of the workpiece of the Yankee cylinder section (1,2);
    a first reinforcement flange (10) protruding outwards along an axial direction of the workpiece of the Yankee cylinder section, wherein the first reinforcement flange is provided on the end face of the workpiece of the Yankee cylinder section (1,2) close to an inner circumferential wall of the workpiece of the Yankee cylinder section (1,2);
    a second reinforcement flange (102) protruding outwards along the axial direction of the workpiece of the Yankee cylinder section (1,2), wherein the second reinforcement flange is provided on the end face of the workpiece of the Yankee cylinder section (1,2) close to a radially inner end of the welding bevel; and
    a second reinforcement flange receiving part (103) adjacent to the second reinforcement flange (102) in a radial direction of the workpiece of the Yankee cylinder section (1,2);
    wherein the second reinforcement flange (102) is adapted to rest on a second reinforcement flange receiving part (203) of another workpiece of Yankee cylinder section to be welded (2), and the second reinforcement flange receiving part (103) is adapted to receive a second reinforcement flange (202) of the another workpiece of Yankee cylinder section to be welded (2), and
    wherein the second reinforcement flange (102) of the workpiece of Yankee cylinder section (1) rests on the second reinforcement flange (202) of the another workpiece of Yankee cylinder section to be welded (2) on corresponding circumferential sides of the second reinforcement flange (202) of the another workpiece of Yankee cylinder section.

2. The workpiece of Yankee cylinder section (1,2) according to claim 1, characterized in that the welding bevel is adapted for narrow gap welding.

3. The workpiece of Yankee cylinder section according to claim 1, characterized in that the first reinforcement flange (101) of the workpiece of Yankee cylinder section is configured to join with a first reinforcement flange (201) of the another workpiece of Yankee cylinder section to be welded, so that the first reinforcement flange of the workpiece of Yankee cylinder section and the first reinforcement flange of the another workpiece of Yankee cylinder section to be welded are welded from inner sides of the workpiece and the another workpiece to be welded of Yankee cylinder section.

4. The workpiece of Yankee cylinder section according to claim 1, characterized in that there are prefabricated grooves on the inner circumferential wall of the workpiece of Yankee cylinder section (1,2), said prefabricated grooves are machinable to final dimensions of inner grooves of the Yankee cylinder.

5. A process for manufacturing a Yankee cylinder, wherein a workpiece of Yankee cylinder section comprises on an end face of the workpiece:
    a welding bevel adapted to be welded from an outside of the workpiece of the Yankee cylinder section (1,2);
    a first reinforcement flange (10) protruding outwards along an axial direction of the workpiece of the Yankee cylinder section, wherein the first reinforcement flange is provided on the end face of the workpiece of the Yankee cylinder section (1,2) close to an inner circumferential wall of the workpiece of the Yankee cylinder section (1,2);
    a second reinforcement flange (102) protruding outwards along the axial direction of the workpiece of the Yankee cylinder section (1,2), wherein the second reinforcement flange is provided on the end face of the workpiece of the Yankee cylinder section (1,2) close to a radially inner end of the welding bevel; and
    a second reinforcement flange receiving part (103) adjacent to the second reinforcement flange (102) in a radial direction of the workpiece of the Yankee cylinder section (1,2);
    wherein the second reinforcement flange (102) is adapted to rest on a second reinforcement flange receiving part (203) of another workpiece of Yankee cylinder section to be welded (2), and the second reinforcement flange receiving part (103) is adapted to receive a second reinforcement flange (202) of the another workpiece of Yankee cylinder section to be welded (2), and
    wherein the second reinforcement flange (102) of the workpiece of Yankee cylinder section (1) rests on the second reinforcement flange (202) of the another workpiece of Yankee cylinder section to be welded (2) on corresponding circumferential sides of the second reinforcement flange (202) of the another workpiece of Yankee cylinder section, the process comprising:
(a) providing the workpieces of Yankee cylinder section (1,2);
(b) joining two of the workpieces of Yankee cylinder section to be welded together to form a Yankee cylinder case in such a way that the second reinforcement flange of the workpiece of Yankee cylinder section rests on the second reinforcement flange receiving part of the another workpiece of Yankee cylinder section;
(c) welding a first reinforcement flanges (101,201) of the two workpieces of Yankee cylinder section (1,2) from an inner side of the Yankee cylinder case;
(d) preheating welding bevels of the two workpieces of Yankee cylinder section (1,2) and welding the welding bevels from an outside of the Yankee cylinder case to form a weld (3);
(e) removing the first reinforcement flange (101,201), the second reinforcement flange (102,202), a radial inner end area of the weld (3) formed by the welding bevels and surrounding material of the welding bevels by machining, so that a joint of the two workpieces of Yankee cylinder section (1,2) is machined to meet final dimension requirements for inner grooves of the Yankee cylinder;
(f) removing residual materials on an outer surface of the Yankee cylinder case and the weld (3) by machining to meet final dimension requirements for an outer diameter of the Yankee cylinder.

6. The process for manufacturing the Yankee cylinder according to claim 5, characterized in that said process comprises a following step after said step (d):
(g) machining prefabricated grooves in the workpiece of Yankee cylinder section (1,2) to meet the final dimension requirements for the inner grooves of the Yankee cylinder.

7. The process for manufacturing the Yankee cylinder according to claim 5, characterized in that, in said step (d), the welding bevels are welded by narrow gap welding.

* * * * *